United States Patent [19]

Breitenfellner et al.

[11] 4,052,356

[45] Oct. 4, 1977

[54] MOLDING COMPOUNDS BASED ON POLYBUTYLENE TEREPHTHALATE

[75] Inventors: Franz Breitenfellner, Bensheim; Josef Hrach, Einhausen, both of Germany

[73] Assignee: Ciba-Geigy Corporation, Ardsley, N.Y.

[21] Appl. No.: 674,258

[22] Filed: Apr. 6, 1976

[30] Foreign Application Priority Data

Apr. 18, 1975 Switzerland .................... 4993/75

[51] Int. Cl.$^2$ .............................................. C08K 3/34
[52] U.S. Cl. ............................................... 260/40 R
[58] Field of Search ...................... 260/40 R, DIG. 24

[56] References Cited

U.S. PATENT DOCUMENTS

| 3,368,995 | 2/1968 | Furukawa et al. | 260/40 R |
| 3,549,585 | 12/1970 | Solomon | 260/40 R |
| 3,764,576 | 10/1973 | Russo | 260/40 R |
| 3,859,246 | 1/1975 | Jackson et al. | 260/40 R |
| 3,873,491 | 3/1975 | Gall | 260/40 R |

OTHER PUBLICATIONS

E. N. Doyle, *The Development and Use of Polyester Products*, (1969), p. 309.
R. F. Gould, ed., *Fillers and Reinforcements for Plastics*, (1974), pp. 80 & 81.

*Primary Examiner*—Sandra M. Person
*Attorney, Agent, or Firm*—Luther A. R. Hall

[57] ABSTRACT

Reinforced polybutylene terephthalate which contain kaolin have improved arc resistance with at the same time improved tracking resistance.

6 Claims, No Drawings

MOLDING COMPOUNDS BASED ON POLYBUTYLENE TEREPHTHALATE

The present invention provides moulding compounds consisting of a polybutylene terephthalate (PBT), a kaolin, a reinforcing filler, and, optionally, in addition a flameproofing agent.

On account of its advantageous processing properties, polybutylene terephthalate has become known as a structural material, glass fibre reinforced and/or flameproofed compositions especially being of importance. Such moulding compounds are disclosed, for example, in German Auslegeschriften Nos. 2,042,447 and 2,042,450.

One disadvantage of these moulding compounds is that both the arc and tracking resistance are unsatisfactory, and it is known that the addition of glass fibres impairs both these properties. Moreover, the further addition of flameproofing agents greatly reduces the arc resistance. The use of moulded articles made from these moulding compounds in the electrical industry, for example distributor caps or coil forms, is therefore very restricted.

In order to be able to use moulding compounds based on polybutylene terephthalate in this field too, the proposal has been made in German Offenlegungsschrift No. 2,256,699 to mix the polymer intimately with needle-shaped calcium metasilicate so as to increase the arc resistance. The disadvantage of this proposal is that calcium metasilicate is a filler of relatively pronounced hardness and processing machinery is thereby subjected to too great wear and high. From published Japanese patent specification 15 191/69 it is known to improve only the arc resistance of glass fibre reinforced polyethylene terephthalate by the addition of china clay.

The present invention therefore has for its object to provide a reinforced moulding compound based on polybutylene terephthalate with greater arc and tracking resistance and which consists of a. a polybutylene terephthalate, b. 5 to 50 percent by weight, referred to the total composition, of a kaolin, and c. 5 to 40, preferably 10 to 40, percent by weight, referred to the total composition, of a reinforcing filler, in particular glass fibres, the amount of kaolin and reinforcing filler being at most 60 percent by weight of the total composition.

By polybutylene terephthalate is meant the polyester derived from 1,4-butanediol. This polyester has been described repeatedly in the literature and is obtained by conventional methods as described, for example, in German Auslegeschrift No. 2,042,447. Up to 20 molar percent of the terephthalic acid can be replaced with aliphatic dicarboxylic acids which contain 3 to 36 carbon atoms. Examples of such dicarboxylic acids are: malonic acid, sebacic acid, adipic acid, trimethylsebacic acid, octadecylsuccinic acid or dimeric acids (dimerisation products of unsaturated carboxylic acids). In general the intrinsic viscosity of this polyester is 0.3 to 2.0, preferably 0.5 to 1.2 dl/g, measured at 30° C in a 1% solution in tetrachloroethane/phenol in the ratio 1:1.

Kaolins (also called china clay) are hydrated aluminium silicates whose properties are described, for example, in H. Petereit, defazet (6) 1973, pp. 268–270. Preferably non-calcined types are used. The compositions preferably contain 10 to 40 percent by weight of kaolin.

Asbestos fibres and especially glass fibres may be cited as examples of reinforcing fillers. The glass fibres can be sized in the usual way to improve the coating of the reinforcing material with the polymer. The total amount of filler is at most 60 percent by weight.

It has further been observed that particularly good results according to the invention are obtained in moulding compounds which contain in addition a flameproofing agent which is incorporated into the polymer in amounts from 2 to 10 percent by weight.

Flameproofing agents are, for example, low molecular organic halides, in particular bromides and/or chlorides, which are derived preferably from hydrocarbons of aromatic character and which can be used together with compounds of elements of the 5th main group of the Periodic Table known to have a synergistic action. Such halides are described in German Auslegeschrift No. 2,042,450. As examples there may be cited: decabromobiphenyl ether, octachlorobiphenyl ether, tetrachloro- or tetrabromophthalic anhydride and, in particular, decabromobiphenyl. Preferred elements of the 5th main group of the Periodic Table are phosphorus and antimony and the preferred compound is in particular antimony trioxide. A particularly preferred flameproofing agent is that which consists of 1 to 5 percent by weight of decabromobiphenyl and 0.5 to 2.5 percent by weight of antimony trioxide, the respective amounts being referred to the total composition.

The moulding compounds of the present invention, which can contain further customary additives, for example lubricants, mould release agents, dyes and/or pigments, are obtained by mixing the components in known mixing devices. The mixing is advantageously effected by granulating using an extruder, it being possible to premix the components first, for example in an eccentric tumbler mixer.

The moulding compounds of the invention can be readily processed to moulded articles of every kind and have an improved arc resistance and at the same time an improved tracking resistance.

The following Examples will serve to described the invention in more detail.

EXAMPLES 1 – 2

After they have been premixed in an eccentric tumbler mixer, the additives listed in Table 1 are incorporated with the aid of a single screw extruder in the given concentrations into poly-1,4-butylene terephthalate with an intrinsic viscosity of 0.90 dl/1 (measured in a 1% solution of phenol/tetrachloroethane in the ratio 1:1), and the resultant moulding compounds are subsequently granulated.

After they have been dried, these mixtures are processed to moulded articles in a screw injunction moulding machine at cylinder temperatures of 250° C and a mould temperature of 80° C. The arc resistance according to DIN 53 480, the tracking resistance according to ASTM D 495 and the flammability according to ASTM D 635 are determined from these articles. The test results are reported in Table 1.

Table 1

| Example | Composition % by weight | Tracking resistance DIN 53 480 process KB (volts) | Arc resistance ASTM D 495 (secs) | Flammability ASTM D 635 (cm/min) |
|---|---|---|---|---|
| 1 comparison Example | 68% of PBT<br>8% of decabromo-diphenyl<br>4% of Sb₂O₃<br>20% of glass fibres | 160 | 15 | non-burning |
| 2 | 54.6% of PBT<br>3.6% of decabromo-diphenyl<br>1.8% of Sb₂O₃<br>20.0% of glass fibres<br>20.0% of china clay | 250 | 80 | non-burning |

EXAMPLE 3

The concentrations of additives listed in Table 2 are incorporated into polybutylene terephthalate in accordance with Example 1, the amounts being referred to the weight of the total composition. After it has been dried, the moulding composition is processed to moulded articles. Owing to the higher concentration of china clay in comparison to Example 2, these moulded articles have an increased tracking and arc resistance. Compared with Example 2, the arc resistance is additionally improved by lowering the concentration of flameproofing agent. Compared with the moulded articles of Example 1, those of the present Example have improved electrical properties.

Table 2

| | Composition (% by weight) | Tensile strength DIN 43 455 (kp/cm²) | Flexural strength ASTM D 790 (kp/cm²) | E-Module DIN 53 457 (kp/cm²) | Dimensional stability under heat ISO/R 75 process A (0° C) | Tracking resistance DIN 53 480 deform.KB (volts) | Arc resistance ASTM D 495 (secs) | Flammability ASTM D 635 (cm/min) |
|---|---|---|---|---|---|---|---|---|
| Example 3 | 46.25% of PBT<br>2.50% of decabromodi-phenyl<br>1.25% of Sb₂O₃<br>20.00% of glass fibres<br>30.00% of china clay | 850 | 1400 | 122.000 | 204 | .275 | 125 | non-burning |

We claim:

1. A moulding compound with improved arc resistance and tracking resistance, consisting of
   a. a polybutylene terephthalate,
   b. 5 to 50 percent by weight, referred to the total composition, of a kaolin, and
   c. 5 to 40 percent by weight, referred to the total composition, of a reinforcing filler, the amount of kaolin and reinforcing filler being at most 60 percent by weight of the total composition.

2. A moulding compound according to claim 1 which contains in addition 2 to 10 percent by weight, referred to the total composition, of a flameproofing agent, the amount of kaolin, reinforcing filler and flameproofing agent being at most 60 percent by weight of the total composition.

3. A moulding compound according to claim 1 which contains 10 to 40 percent by weight of kaolin.

4. A moulding compound according to claim 2 which contains as flameproofing agent 1 to 5 percent by weight of decabromobiphenyl and 0.5 to 2.5 percent by weight of antimony trioxide, the respective amounts being referred to the weight of the total composition.

5. A moulding compound according to claim 1 which contains 10 to 40 percent by weight, referred to the total composition, of a reinforcing filler.

6. A moulding composition according to claim 1 wherein the reinforcing filler is glass fibres.

* * * * *